US007821956B2

(12) United States Patent
Retana et al.

(10) Patent No.: US 7,821,956 B2
(45) Date of Patent: *Oct. 26, 2010

(54) SYSTEM AND METHOD FOR CONTROLLING THE FLOODING OF INFORMATION IN A NETWORK ENVIRONMENT

(75) Inventors: Alvaro E. Retana, Morrisville, NC (US); David A. Cook, Raleigh, NC (US); Russell I. White, Holly Springs, NC (US); Yi Yang, Morrisville, NC (US); Madhavi W. Chandra, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 159 days.

This patent is subject to a terminal disclaimer.

(21) Appl. No.: 11/877,104

(22) Filed: Oct. 23, 2007

(65) Prior Publication Data
US 2008/0043635 A1 Feb. 21, 2008

Related U.S. Application Data

(63) Continuation of application No. 10/762,856, filed on Jan. 21, 2004, now Pat. No. 7,289,707.

(51) Int. Cl.
*H04J 1/00* (2006.01)
(52) U.S. Cl. .................. 370/252; 370/351; 370/469
(58) Field of Classification Search .......... 370/219, 370/254, 356, 389, 392, 400
See application file for complete search history.

(56) References Cited

U.S. PATENT DOCUMENTS 5,345,558 A 9/1994 Opher et al. ............. 395/200

5,511,122 A 4/1996 Atkinson ................. 380/25

(Continued)

FOREIGN PATENT DOCUMENTS

EP 0 348 331 A2 12/1989

(Continued)

OTHER PUBLICATIONS

Canadian Intellectual Property Office letter to Gowling LaFleur Henderson LLP regarding Requisition by the Examiner in Accordance with Subsection 30(2) of the Patent Rules for Canadian Patent Application No. 2,548,340 dated May 26, 2009, 6 pages.

(Continued)

*Primary Examiner*—Ayaz R Sheikh
*Assistant Examiner*—Mounir Moutaouakil
(74) *Attorney, Agent, or Firm*—Baker Botts L.L.P.

(57) ABSTRACT

An apparatus for communicating packets in a network environment is provided that includes a first network element that includes a first neighbor list, the first network element being coupled to a second network element and a third network element. The first network element is operable to receive a second neighbor list from the second network element and a third neighbor list from the third network element. The first network element is further operable to determine one or more overlaps provided by the second and third neighbor lists when compared to the first neighbor list, the first network element relaying an update that it receives based on the one or more overlaps.

20 Claims, 2 Drawing Sheets

U.S. PATENT DOCUMENTS

| | | | | |
|---|---|---|---|---|
| 5,590,118 | A | 12/1996 | Nederlof | 370/218 |
| 5,757,924 | A | 5/1998 | Friedman et al. | 380/49 |
| 5,815,490 | A | 9/1998 | Lu | |
| 5,825,772 | A | 10/1998 | Dobbins et al. | 370/396 |
| 5,881,243 | A | 3/1999 | Zaumen et al. | 395/200.71 |
| 5,926,101 | A | 7/1999 | Dasgupta | 340/825.02 |
| 6,055,561 | A | 4/2000 | Feldman et al. | 709/200 |
| 6,069,889 | A | 5/2000 | Feldman et al. | 370/351 |
| 6,108,702 | A | 8/2000 | Wood | 709/224 |
| 6,111,884 | A | 8/2000 | Ahuja et al. | 370/401 |
| 6,130,889 | A | 10/2000 | Feldman et al. | 370/397 |
| 6,131,120 | A | 10/2000 | Reid | 709/225 |
| 6,148,000 | A | 11/2000 | Feldman et al. | 370/397 |
| 6,151,324 | A | 11/2000 | Belser et al. | 370/397 |
| 6,256,295 | B1 | 7/2001 | Callon | 370/254 |
| 6,347,078 | B1 | 2/2002 | Narvaez-Guarnieri et al. | 370/230 |
| 6,366,962 | B1 | 4/2002 | Teibel | |
| 6,385,174 | B1 | 5/2002 | Li | 370/252 |
| 6,393,486 | B1 | 5/2002 | Pelavin et al. | 709/238 |
| 6,405,248 | B1 | 6/2002 | Wood | 709/223 |
| 6,449,279 | B1 | 9/2002 | Belser et al. | 370/397 |
| 6,483,833 | B1 | 11/2002 | Jagannath et al. | 370/392 |
| 6,526,052 | B1 | 2/2003 | Rijhsinghani et al. | 370/389 |
| 6,535,510 | B2 | 3/2003 | Kalkunte et al. | 370/389 |
| 6,578,086 | B1 | 6/2003 | Regan et al. | 709/242 |
| 6,584,093 | B1 | 6/2003 | Salama et al. | 370/351 |
| 6,625,156 | B2 | 9/2003 | Shaio et al. | 370/395.21 |
| 6,639,897 | B1 | 10/2003 | Shiomoto et al. | 370/238 |
| 6,657,965 | B1 | 12/2003 | Shaffer et al. | 370/238 |
| 6,823,395 | B1 | 11/2004 | Adolfsson | |
| 6,985,959 | B1 | 1/2006 | Lee | |
| 7,200,149 | B1 | 4/2007 | Hasty, Jr. | |
| 7,298,707 | B2 | 11/2007 | Retana et al. | |
| 2002/0093967 | A1 | 7/2002 | Perlman et al. | |
| 2002/0145978 | A1 | 10/2002 | Batsell et al. | |
| 2003/0067924 | A1 | 4/2003 | Choe et al. | |
| 2003/0067925 | A1* | 4/2003 | Choe et al. | 370/400 |
| 2003/0179742 | A1 | 9/2003 | Ogier et al. | 370/351 |
| 2004/0018839 | A1 | 1/2004 | Andric et al. | 455/433 |
| 2004/0028060 | A1 | 2/2004 | Kang | |
| 2004/0247317 | A1 | 12/2004 | Sadananda | |
| 2005/0105475 | A1* | 5/2005 | Norrgard et al. | 370/254 |
| 2005/0111494 | A1* | 5/2005 | Kecskemeti | 370/521 |
| 2005/0135429 | A1* | 6/2005 | Bingham et al. | 370/503 |
| 2005/0265260 | A1 | 12/2005 | Zinin et al. | |
| 2007/0263628 | A1* | 11/2007 | Axelsson et al. | 370/392 |

FOREIGN PATENT DOCUMENTS

| | | |
|---|---|---|
| WO | WO 97/02688 | 1/1997 |
| WO | WO 00/42746 | 7/2000 |

OTHER PUBLICATIONS

PCT International Search Report, International Application No. PCT/US05/01106, mailed Oct. 26, 2006, 10 pages.

J. Rosenberg, H. Salama, M. Squire, Telephony Routing Over IP (TRIP), Network Working Group, RFC 3219, 74 pgs., Jan. 2002.

Thomas L. Rodeheffer and Michael D. Schroeder, "*Automatic Reconfiguration in Autonet*", Operating Systems Review (SIGOPS), vol.. 25, No. 5, New York, US, XP 000288311, 15 pages, Jan. 01, 1991.

European Patent Office Communication, Supplementary European Search Report and Annex to the European Search Report; Application No. 0511422.5-1249/1716500; Ref. P28753EP-PCT dated Jul. 12, 2009 forwarded by foreign associate to Baker Botts on Jan. 26, 2010; 4 pages.

State Intellectual Property Office of the People's Republic of China, The First Office Action and Text of the First Office Action for Application No. 200580001386.7, transmitted to Baker Botts L.L.P. by Foreign Associate on Jul. 22, 2010, 4 pages.

\* cited by examiner

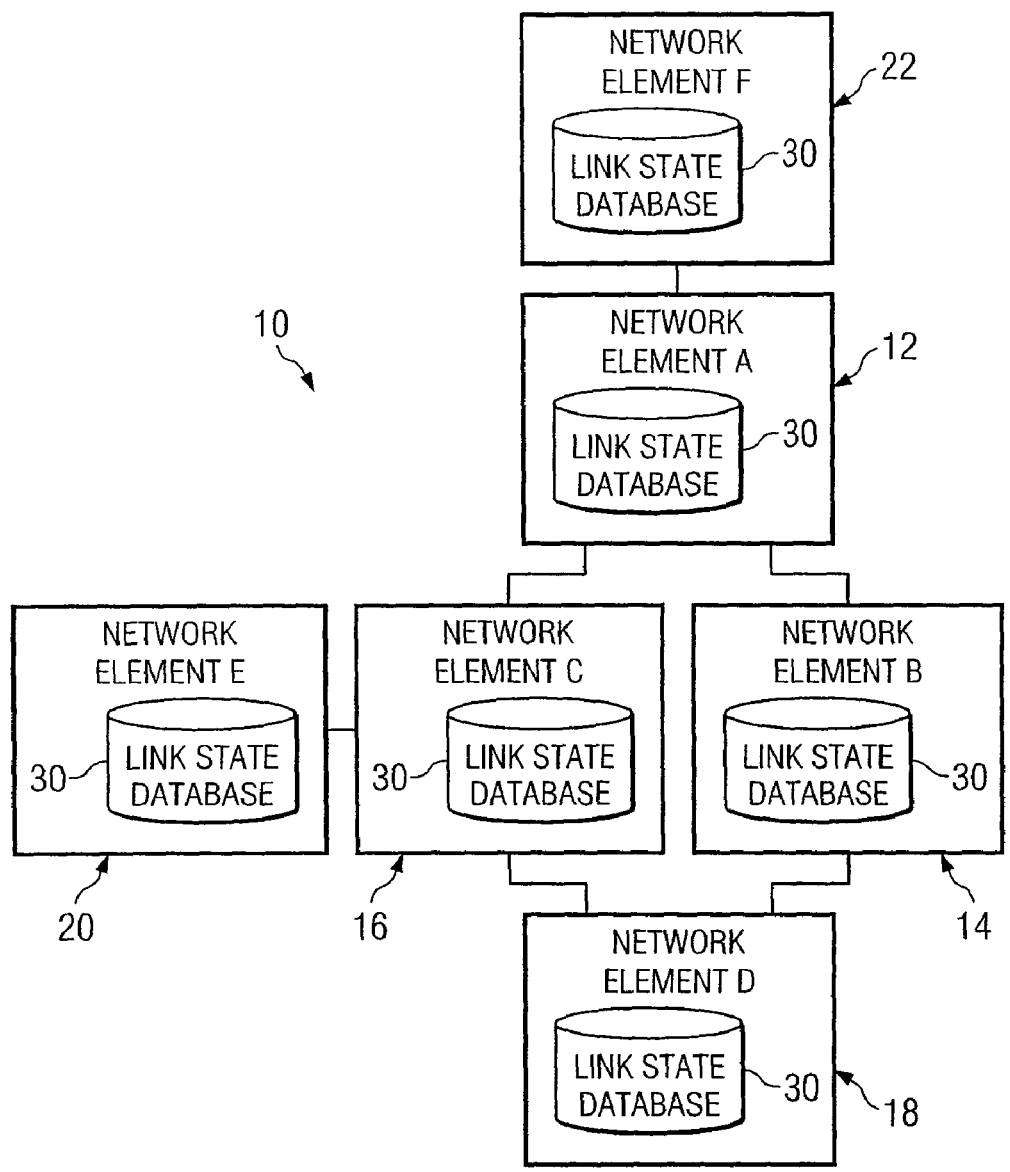

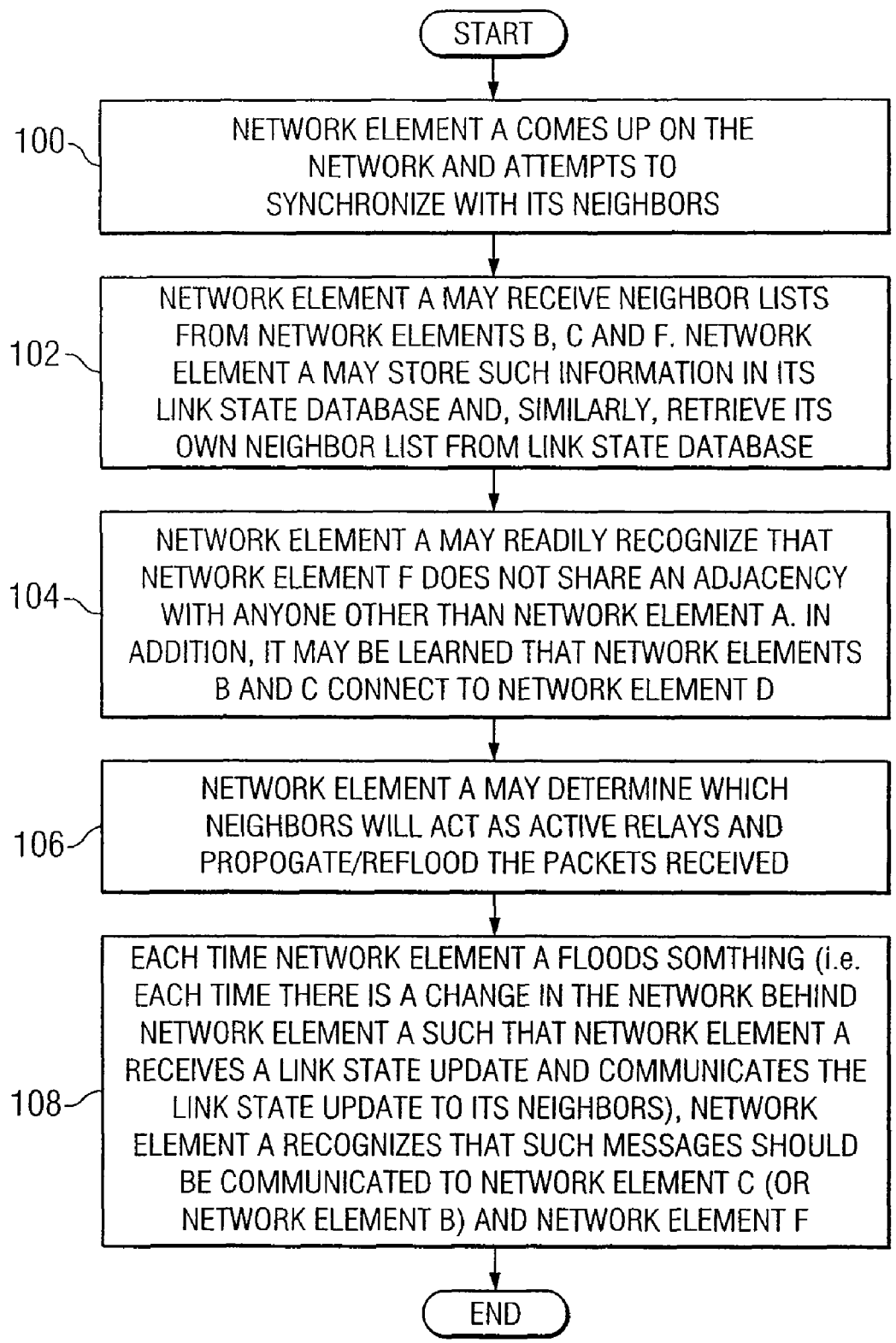

SYSTEM AND METHOD FOR CONTROLLING THE FLOODING OF INFORMATION IN A NETWORK ENVIRONMENT

CROSS-REFERENCE TO RELATED APPLICATION

This application is a continuation of U.S. application Ser. No. 10/762,856 filed Jan. 21, 2004 and entitled "System and Method for Controlling the Flooding of Information in a Network Environment".

TECHNICAL FIELD OF THE INVENTION

This invention relates in general to the field of communications and, more particularly, to a system and method for controlling the flooding of information in a network environment.

BACKGROUND OF THE INVENTION

Networking architectures have grown increasingly complex in communication environments. This complexity has resulted in numerous protocols being implemented in order to ensure that network elements are aware of their surroundings and direct packets in an efficient manner. For example, certain network elements may exchange packets in order to indicate to each other the absence or presence of an adjacent network element or to provide rating updates. In this sense, neighbors are able to become aware of their surroundings and direct or manage traffic properly.

As network systems become more sophisticated, this information exchange may become cumbersome. This may be due to any number of reasons, such as having a prolific amount of network elements in the system or having an abundance of signaling being exchanged between network elements. Note that in certain network environments, a group of network elements that share the same logical segment may not be directly visible to each other. Some possible causes of this shielding may include: low signal strength, long distance separation, environmental disruptions, partial VC meshing, etc. In these scenarios, some network elements or speakers (the ones not able to directly reach the sender) may never be able to synchronize their information such that data is routed correctly.

As a byproduct of improper routing, redundant signaling, and an inefficient management of data, communication speeds and system performance for an architecture may be inhibited. Moreover, because of the overwhelming quantity of information that may be exchanged in the network, bandwidth may be unnecessarily restricted. The ability to properly identify surrounding elements and account for other elements is critical in providing effective network communications. Thus, the ability to offer a system or a protocol that optimally routes information based on existing network elements provides a significant challenge to network designers, component manufacturers, and system administrators.

SUMMARY OF THE INVENTION

From the foregoing, it may be appreciated by those skilled in the art that a need has arisen for an improved communications approach that minimizes the flooding of information in packet communications in a network environment. In accordance with one embodiment of the present invention, a system and a method for controlling the flooding of information in a network environment are provided that greatly reduce disadvantages and problems associated with conventional packet communication techniques.

According to one embodiment of the present invention, there is provided an apparatus for communicating packets in a network that includes a first network element that includes a first neighbor list, the first network element being coupled to a second network element and a third network element. The first network element is operable to receive a second neighbor list from the second network element and a third neighbor list from the third network element. The first network element is further operable to determine one or more overlaps provided by the second and third neighbor lists when compared to the first neighbor list, the first network element relaying an update that it receives based on the one or more overlaps.

Certain embodiments of the present invention may provide a number of technical advantages. For example, according to one embodiment of the present invention, a communications approach is provided that allows for relay decisions based on dynamic network information, which may be provided for in corresponding neighbor lists. Such an ability may conserve resources and reduce network overhead. This may be a result of the ability to direct packets more efficiently to their intended destination. Moreover such information management techniques may reduce the number of central processing unit (CPU) cycles needed to be performed by a given network component, as the local flooding of information is minimized in overlapping broadcast domains. Thus, because less information is being transmitted in the network, fewer resources are consumed as the data is properly processed. Additionally, the reduction in network traffic may translate into less network bandwidth being occupied by routing protocols engaged in state maintenance. This may be particularly important in certain types of networks, e.g. lower speed networks, shared medium networks, etc., but generally beneficial to any packet communications.

Another technical advantage associated with one embodiment of the present invention relates to a failover characteristic. In general, an automatic backup feature is provided by such a communications architecture. Such reliability may be achieved even in cases in which a relay decision is not required. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 1 is a simplified block diagram of a communication system for controlling the flooding of information in a network environment in accordance with one embodiment of the present invention; and FIG. 2 is a simplified flowchart illustrating a series of example steps associated with the communication system.

DETAILED DESCRIPTION OF EXAMPLE EMBODIMENTS OF THE INVENTION

FIG. 1 is a simplified block diagram of a communication system 10 for controlling the flooding of information in a network environment. Communication system 10 may include multiple network elements 12, 14, 16, 18, 20, and 22.

Network elements 12, 14, 16, 18, 20, and 22 may also be referred to herein as network elements A-F respectively. The letter designations assigned to network elements 12, 14, 16, 18, 20, and 22 are arbitrary and have been used for purposes of teaching only. These designations should not be construed in any way to limit their capabilities, functionalities, or applications in the potential environments that may benefit from the features of communication system 10. Each network element 12, 14, 16, 18, 20, and 22 may be equipped with a link state database 30 that includes information associated with surrounding network elements, as well as data to be used in routing packets in the context of network communications. Additional details relating to the architecture and functionality of link state database 30 is provided below.

FIG. 1 may be generally configured or arranged to represent any communication architecture capable of exchanging packets in a network environment. Such configurations may include, for example, first generation, 2G, 2.5G, and 3G architectures that offer packet-exchanging capabilities. In addition, communication system 10 may include any suitable networking protocol or arrangement that provides a communicative platform for communication system 10. Thus, communication system 10 may include a configuration capable of transmission control protocol/internet protocol (TCP/IP) communications for the transmission or reception of packets in a network. Communication system 10 may also operate in conjunction with a user datagram protocol/IP (UDP/IP) or any other suitable protocol where appropriate.

In accordance with the teachings of the present invention, communication system 10 provides a communication approach that allows network elements A-F to exchange information via a suitable protocol such that only a minimum amount of state information is broadcast to each network element. In certain network environments, a designated network element or a designated intermediate system is often employed to achieve synchronization. When a piece of network equipment appears on the network it would quickly determine the designated network element (e.g. router) or designated link and synchronize with that object. This could achieve synchronization in the network but be inhibited by hidden node problems.

Note that a group of network elements that share the same logical segment may not be directly visible to each other. Potential causes for this deficiency may relate to the following: low signal strength, long distance separation, environmental disruptions, partial VC meshing, etc. In such a network context, a logical segment refers to the local flooding domain dynamically determined by a transmission radius. In these scenarios, some nodes or speakers (the ones not able to directly reach the sender) may never be able to synchronize their link state databases 30. To resolve the synchronization issues encountered in these environments, a mechanism is needed through which all the nodes on the same logical segment can receive the routing information, regardless of the state of their adjacency to the source.

Communication system 10 provides such a mechanism that ensures that the flooding of information will reach all neighbors regardless of the current state of the network. Communication system 10 additionally addresses hidden node issues, as well as other network deficiencies, in providing an environment that achieves synchronization of a link state database with surrounding nodes without having to sacrifice valuable bandwidth or processing time. Communication system 10 may offer dynamic/adaptive relaying decisions made at flooding time intervals that account for network topology changes. Communication system 10 may further implement the use of an intelligent transmission of acknowledgements.

For purpose of teaching, it is important to understand the extensive communications that may be traversing the network in order to provide awareness data or routing information to any given network element. Routing protocols generally include various types of neighbor states in their periodically transmitted neighbor state packets. For instance, a routing protocol may include a list of known neighbors on a given link so that each network element A-F attached to that network can establish whether or not two-way connectivity exists between itself and the network element that is transmitting the packet.

In most scenarios, it is generally important to be made aware of the presence or the absence of a neighbor as quickly as possible. Thus, packets may be communicated to adjacent network elements in order to provide routine or systematic updates, which reflect current or the most recent state information. In this sense, network elements need only know what is new or what has been changed in the network.

The packets received by network element A-F may be congruous, inclusive of an extensive listing of the neighbors that are present or absent in the network. The absence of a neighbor may indicate that something has happened: for example, some element has become non-operational or dysfunctional. The presence of a network element may reflect an already existing element or a new element that was added to the networking architecture. The optimized flooding operation of communication system 10 may rely on the ability of a speaker to advertise all of its locally 'connected' neighbors. It may be assumed that this ability is realized through the use of routing protocol packets.

A given network element A-F (i.e. a speaker) may receive routing protocol packets from all other adjacent speakers. The routing protocol packets may contain a list of the adjacent speakers to the originator (i.e. a neighbor list, a neighbor table, or a neighbor database). The local speaker may compare the neighbor list reported by each speaker to its own neighbor list. If the local neighbor list contains adjacent speakers that the sender of a routing update cannot reach directly (i.e. those speakers that are not in the originator's neighbor list), then the local speaker should relay the information to them based on the algorithm, which is more fully detailed below. Because more than one such speaker may exist, the mechanism may be referred to as an overlapping relay.

In general, such a technique is dynamic, as the decision as to which speaker (or node) should act as a relay is determined at the time of flooding and is based on current network topology. The algorithm, however, may be configured to select the set of overlapping relays that should transmit first. This set may be referred to as the 'active' set of overlapping relays for a given node.

With regard to overlap and relay decisions, the first step in the process is for each speaker to build and propagate their neighbor lists. Such lists may be stored in link state database 30 in an example embodiment of the present invention. In other scenarios, the neighbor list may be stored in any appropriate location or medium. In its routing protocol message, a speaker may identify an active set of overlapping relays that should transmit first to further propagate routing updates. This active set of overlapping relays is the minimum set of direct neighbors that are peers with all two-hop neighbors of the speaker. Other arrangements may call for single-hop or three or more hop configurations and be based on particular needs. In one example embodiment used for purposes of teaching only, this selection algorithm may based on the multipoint relay (MPR) selection algorithm defined in optimized link state routing protocol (OLSR). Once a network element has received the neighbor lists from all of its adjacent peers, it can now determine the overlaps that may exist. The decision whether to relay any received information and when to relay such information may depend on the current topology of the network. Such a determination may also be based on whether the node is part of the active set of overlapping relays.

For each adjacent speaker, the contents of the local neighbor list may be compared to the received list to make flooding decisions according to the following example algorithm. In the following example operation, network elements A-F are illustrated as routers. In a first step, each neighbor list received includes a list of adjacent speakers, including the local router. The local router may be ignored for the purpose of the comparison, as is the adjacent router for which the comparison is being done (the originator). In a second step, if the lists overlap completely (i.e. all the components of both lists are the same), then the local router should not immediately relay any information received from the adjacent speaker, regardless of whether the node was identified as an active overlapping relay in the adjacent speaker's routing protocol message. Note that this is because the topology may have changed since the last received routing protocol message from the adjacent speaker such that a transmission by the node will only result in a redundant transmission.

In a third step, if the local neighbor list is completely contained in the received list (i.e. all the components of the local neighbor list are present in the received one), then the local router should not immediately relay any information received from the adjacent speaker, regardless of whether the node was identified as an active overlapping relay in the adjacent speaker's routing protocol message. In a fourth step, if some of the components of the local neighbor list are not present in the received list (non-overlapping neighbors) and the node is an active overlapping relay for the adjacent speaker, then the router may immediately relay any information received from the adjacent speaker.

In a fifth step, if some of the components of the local neighbor list are not present in the received list (non-overlapping neighbors) and the node is not an active overlapping relay for the adjacent speaker, then the router may wait a specified amount of time (e.g. pushback time plus jitter) to decide whether to transmit. [The jitter may be used to avoid several 'non-active' overlapping relays from propagating redundant information.] Note that non-active overlapping relays may follow the acknowledgment mechanism provided below.

During this time, if the node determines that its flooding of the update will only result in a redundant transmission, the node may suppress its transmission. Otherwise, the node may transmit upon expiration of the pushback time plus jitter. In cases where a non-active overlapping relay hears a re-flood from another non-active overlapping relay that covers its non-overlapping neighbors before its timer to transmit expires, the node may wait a specified amount of time (e.g. backoff time plus jitter) to decide whether to transmit. During this time, if the node determines that flooding of the update will only result in a redundant transmission, the node may suppress its transmission. Otherwise, the node may transmit upon expiration of backoff time plus jitter.

In a sixth step, for routing updates that are received unicast because of retransmission by the originator, the node may determine whether it has already received the routing update from another speaker. If it already has the routing update in its database, it needs to do nothing further, as it would have taken appropriate measures when it initially received the routing update. However, if it does not have the routing update in its link state database 30, the node may take action according to the rules above, just as if it received the multicast routing update.

In a seventh step, the result of the comparison and the decisions is that the speakers on the logical segment may receive all of the routing information. Note that a node can determine whether its further flooding of an update will only result in a redundant transmission by hearing acknowledgements or re-floods for the routing update from its non-overlapping neighbors.

Due to the dynamic nature of a network, the active set of overlapping relays may not be up-to-date at the time the relay decision is made or may not be able to perform the flooding duties (e.g. due to poor link quality). The non-active overlapping relays may prevent this situation from causing database synchronization issues, which may result in packet losses. Because the originator of the information, the relay, and the receiver are all in the same dynamically determined local flooding domain, the relay may not change the routing update information. In general, routing updates may be sent to a common/well-known multicast address. In some cases, routing updates may be sent using unicast.

Thus, as evidenced by the operational flow provided above, communication system 10 provides an architecture that allows for relay decisions based on dynamic network information, which may be provided for in corresponding neighbor lists. Such an ability may operate to conserve network resources and reduce network overhead. This may be a result of the ability to direct a minimum number of packets more efficiently to their intended destination. Such information management techniques may reduce the number of central processing unit (CPU) cycles needed to be performed by a given network component, as the local flooding of information is minimized in overlapping broadcast domains. Thus, because less information is being transmitted in the network, fewer resources are consumed as the packet is properly processed. Additionally, the reduction in network traffic may translate into less network bandwidth being occupied by routing protocols engaged in state maintenance. This may be particularly important in certain types of networks, e.g. lower speed networks, shared medium networks, etc., but generally beneficial to any packet communications. Communication system 10 may also provide a failover characteristic for network communications in offering an automatic backup feature. Such reliability may be achieved even in cases in which a relay decision is not required.

Communication system 10 is also capable of performing an intelligent transmission of acknowledgements. In order to optimize the bandwidth utilization on the link, a speaker may perform the following steps, which are related to acknowledgement transmissions. First, acknowledgements may be sent to a well-known multicast address. Second, routing updates may be acknowledged by all of the adjacent speakers. In the case of relayed information, the relay may only expect either explicit or implicit acknowledgements from peers that have not previously acknowledged a transmission. The retransmission procedures, if any exist, for the underlying protocol may be followed.

Third, because routing updates are sent to well-known multicast addresses, the set of overlapping speakers may usually receive the same update more than once. A speaker should only acknowledge the first update received on the link. Fourth, an active overlapping relay should not explicitly acknowledge information that it is relaying. The relayed information may serve as an acknowledgement to the sender. If no information is being relayed, then an explicit acknowledgement may be sent.

Fifth, several acknowledgements may be bundled into a single packet. However, the wait (acknowledgement time) before sending one such packet should generally be less than the pushback time minus propagation delays, (i.e., [(acknowledgement time+propagation delay)<pushback time]). The bundling operation may reduce the number of packet transmissions required in acknowledging multiple routing updates. Sixth, all acknowledgement packets should reset the dead timer at the receiver and the routing protocol timer at the sender. An acknowledgement received from a non-overlapping speaker should prevent redundant transmission of the information to it by another overlapping relay.

Note that with the example provided above, as well as numerous other examples provided herein, interaction is described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

With respect to protocol considerations, the mechanism described above refers to the operation of relays on a common media segment. Hence, the information may be relayed out the same interface through which it was received. The information is generally not altered when relayed.

For link state protocols, the concept of information relay may be extended to the flooding of all link state advertisements received on any interface (and forwarded on any other interface). Link state protocols work on the premise that all of the nodes in a routing domain will receive all of the routing information. Where each speaker advertises all of its adjacent neighbors on all interfaces, then the overlap check (described supra) may result in the determination of which speakers are adjacent to both speakers. As a result, link state information may only be flooded to non-overlapping neighbors (considering all of the interfaces).

The intent of the overlapping relay mechanism is to optimize flooding of routing information. However, other information (such as data) may also be relayed in some networks using the same mechanism. Specifically, networks using distance vector protocols may use a path through which the next hop is not adjacent, but through which an update was received. In such a case, the receiver may influence the cost/metric of any update received based on the fact that the information was relayed.

Network elements A-F are routers in an example embodiment; however, network elements A-F may be any other suitable device where appropriate and in accordance with particular needs. For example, network elements A-F may be switches, gateways, bridges, loadbalancers, firewalls, or any other suitable device, component, element, or object operable to exchange information in a network environment. In addition, network elements A-F may include any suitable hardware, software, components, modules, interfaces, or objects that facilitate the operations thereof. This may be inclusive of appropriate algorithms and communication protocols that allow for the effective exchange of data or information. In an example embodiment, the update and routing information may be exchanged via routing protocol packets. In alternative embodiments, network elements A-F may use any suitable communication protocols that operate to indicate the presence or absence of surrounding or adjacent network elements. Note that the terms 'adjacent' and 'surrounding' reflect broad terminology that may be used interchangeably herein in this document. These terms connote an idea of awareness, as it relates to the presence or absence of any component, device, or element.

Link state databases 30 may be included in network elements A-F. In other embodiments, link state databases 30 may be provided externally to network elements A-F, or consolidated such that a single link state database 30 serves multiple network elements. Link state databases 30 are memory elements for storing information to be referenced by corresponding network elements A-F. As used herein in this document, the term 'link state database' is inclusive of any suitable database or storage medium (provided in any appropriate format) that is capable of maintaining information pertinent to the routing and/or processing operations of network elements A-F. For example, link state databases 30 may store such information in a table or a queue. Alternatively, link state database 30 may keep such information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs. Note that the neighbor list, as described herein, is also amenable to such flexibility. Accordingly, it may be provided in any of the potential storage elements identified above (or provided externally as discussed supra). The neighbor list may also be included in a neighbor table or a neighbor database, or be replaced thereby where appropriate.

FIG. 2 is a simplified flowchart illustrating a series of example steps associated with a method for controlling the flooding of information within communication system 10. For example, FIG. 2 represents an example operation from the perspective of network element A. In such a configuration, as well as other configurations described with reference to FIGS. 1-2, the corresponding network element may be suitably equipped with a receiving state (interface), a transmitting state (interface), and/or any suitable algorithm, software, hardware, module, object or element operable to effectuate the operations of the corresponding network element.

The flowchart may begin at step 100, where network element A comes up on the network and attempts to synchronize with its neighbors. Network element A may receive neighbor lists from network elements B, C and F at step 102. Network element A may store such information in its link state database 30 and, similarly, retrieve its own neighbor list. In this example scenario, at step 104 network element A may readily recognize that network element F does not share an adjacency with anyone other than network element A. In addition, it may be learned that network elements B and C connect to network element D. Thus, a selected one of network element C and network element B could readily communicate with network element D for purposes of synchronization. In addition, network element C could relay information to network element E, as illustrated in the example configuration of FIG. 1.

Steps 106 and 108 cooperate in order to create the active set and execute the relay task respectively. Thus, at step 106, network element A may determine which neighbors should act as active relays and propagate/reflood the packets received. An algorithm may be invoked to determine which set of neighbors are overlapping relays. If it is determined that sending the information once to two neighbors will achieve the update being received by all members of the peer list maintained by network element A, then such a signaling would be an advancement over having to broadcast a signal directly to every member of the peer list.

The algorithm may ensure that, for this example, all two-hop (i.e. a distance of two-hops or nodes away from the transmitting node) neighbors receive an update issued by network element A. This may be achieved by examining the two-hop neighbors versus the one-hop neighbors or directly connected peers. Now, each time network element A floods something (i.e. each time there is a change in the network behind network element A such that network element A receives a link state update and communicates the link state update to its neighbors), network element A recognizes that such messages should be communicated to network element C (or network element B) and network element F. This recognition is reflected at step 108, as the relay task is properly performed.

In essence, it is beneficial to send as little as possible and yet still reach all peers. Thus, the tension or the tradeoff exists in attempting to minimize the number of transmissions for network element A, while still ensuring that all neighbors are reached. It may be presumed in this scenario that in reaching all two-hop neighbors, all members of the peer list are reached. This is because all receiving network elements are performing similar operations such that they are reaching their two-hop neighbors. In a general sense, an exponential increase is achieved by implementing such a protocol throughout the network.

The synchronization efforts of network element A may be triggered on initiated when adjacency protocols are executed (e.g. an exchange of routing protocol packets between network devices). When network A comes up, it may exchange neighbor lists with network elements B and C. Network element A may invoke an algorithm in order to identify that anything sent to (for example) network element C will be received by network elements B, D, and E. However, because network element F does not share an adjacency with network elements B, C, D, or E, it may also receive a separate signal from network element A.

It is important to note that the steps in FIG. 2 illustrate only some of the possible scenarios that may be executed by or within communication system 10. Some of these steps may be deleted or removed where appropriate, or these steps may be modified or changed considerably without departing from the scope of the present invention. In addition, a number of these operations have been described as being executed concurrently with, or in parallel to, one or more additional operations. However, the timing of these operations may be altered considerably. The preceding operational flow has been offered for purposes of example and discussion. Substantial flexibility is provided by communication system 10 in that any suitable arrangements, chronologies, hop configurations, and timing mechanisms may be provided without departing from the teachings of the present invention.

In the context of yet another example scenario, used to illustrate the teachings of communication system 10, active and backup relays could operate in the following manner. Network element A may specify network element C as the active overlapping relay in network element A's routing protocol packets (e.g. via a HELLO packet). When network element A originates an update, which may be caused by a local topology change, network element A can flood this information out. When network element C receives the packet from network element A, it understands that it's the active relay. Additionally, network element C has neighbors (network element D and network element E in one example) that are not in network element A's neighbor list. Thus, it will relay the packets immediately.

In the case of a backup scenario, assume that the link between network element C and network element D is broken, or that network element C is non-operational. In such a scenario, network element D never gets the packet relayed by network element C. After network element B waits for a given time interval (e.g. pushback+jitter), because network element B never receives an explicit/implicit ACK message from network element D about the packet, network element B can relay the packet to network element D. This set of operations illustrate an example backup process that is properly executed.

Although the present invention has been described in detail with reference to particular arrangements and configurations, these example configurations and arrangements may be changed significantly without departing from the scope of the present invention. For example, although the present invention has been described with reference to particular communication exchanges involving a routing protocol packet, communication system 10 may be applicable to other exchanges, routing protocols, or routed protocols in which packets (not necessarily the routing protocol packets described) are exchanged in order to provide routing updates or awareness information. Moreover, communication system 10 may be applicable to any suitable element or component within the network that seeks to identify an optimal set of routing paths and become aware of its neighboring devices through any communications protocol. Thus, any application where there is a need to communicate state information (potentially in an incremental manner), and where synchronization may be beneficial, may benefit from the teachings of communication system 10.

In addition, although communication system 10 has been illustrated with reference to particular elements and operations that facilitate the communication process, these elements and operations may be replaced by any suitable architecture or process that achieves the intended functionality of communication system 10. For example, an external component or module may be positioned in front of each of network elements A-F in order to provide one or more operations as described herein. In addition, network elements A-F may be capable of executing numerous other operations other than those described with reference to FIGS. 1-2. The present invention anticipates considerable flexibility in the placement, positioning, configuration, and operations of network elements A-F.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus, comprising:
   a first network element that includes a first neighbor list, the first network element coupled to a second network element and a third network element, the first network element operable to:

receive a second neighbor list from the second network element;
determine one or more overlaps of the second neighbor list and the first neighbor list, an overlap indicating that the first network element and the second network element are overlapping relays for the third network element;
receive an update from the second network element;
if the first neighbor list and the second neighbor list do not overlap completely and the first network element is designated as non-active, wait a selected time interval and then determine whether to relay the update according to the one or more overlaps; and
otherwise, determine whether to relay the update according to the one or more overlaps.

2. The apparatus of claim 1, the first network element operable to:
if the first neighbor list and the second neighbor list overlap completely, then not relay the update when it is received from the second network element.

3. The apparatus of claim 1, wherein the update is provided in a routing protocol packet that includes an origin associated with the update.

4. The apparatus of claim 1, the first network element operable to:
if the first neighbor list and the second neighbor list do not overlap completely and the first network element is designated as active, then relay the update when it is received from the second network element.

5. The apparatus of claim 1, wherein the selected time interval is substantially equal to a pushback time plus a jitter time.

6. The apparatus of claim 1, the first network element operable to:
determine that relaying of the update will result in a redundant transmission; and
suppress the relaying of the update.

7. The apparatus of claim 1, the first network element is operable to:
glean data associated with a selected one of an acknowledgement and a re-flood both of which are associated with the update, the acknowledgement and the re-flood being communicated by one or more non-overlapping neighbors; and
determine from the data whether relaying the update will result in a redundant transmission.

8. The apparatus of claim 1, wherein the first network element includes a link state database operable to store the first neighbor list.

9. A method, comprising:
receiving, by a first network element that includes a first neighbor list, a second neighbor list from a second network element;
determining, by the first network element, one or more overlaps of the second neighbor list and the first neighbor list, an overlap indicating that the first network element and the second network element are overlapping relays for the third network element;
receiving an update from the second network element;
if the first neighbor list and the second neighbor list do not overlap completely and the first network element is designated as non-active, waiting a selected time interval and then determine whether to relay the update according to the one or more overlaps; and
otherwise, determining, by the first network element, whether to relay the update according to the one or more overlaps.

10. The method of claim 9, the determining whether to relay the update further comprising:
if the first neighbor list and the second neighbor list overlap completely, then not relaying the update when it is received from the second network element.

11. The method of claim 9, the determining whether to relay the update further comprising:
if the first neighbor list and the second neighbor list do not overlap completely and the first network element is designated as active, then relaying the update when it is received from the second network element.

12. The method of claim 9, wherein the selected time interval is substantially equal to a pushback time plus a jitter time.

13. The method of claim 9, the determining whether to relay the update further comprising:
determining that relaying of the update will result in a redundant transmission; and
suppressing the relaying of the update.

14. The method of claim 9, the determining whether to relay the update further comprising:
gleaning data associated with a selected one of an acknowledgement and a re-flood both of which are associated with the update, the acknowledgement and the re-flood being communicated by one or more non-overlapping neighbors; and
determining from the data whether relaying of the update will result in a redundant transmission.

15. The method of claim 9, further comprising:
storing the first neighbor list in a link state database provided in the first network element.

16. The method of claim 9, further comprising:
deciding which element should relay the update based on network topology.

17. The method of claim 9, further comprising:
deciding which element should relay the update dynamically and concurrently with flooding operations.

18. The method of claim 9, wherein the relay is non-active or active, and wherein the relay is sent to a multicast address.

19. The method of claim 9, wherein the relaying does not alter data included in the update.

20. The method of claim 9, wherein the relaying of the update is performed via an interface that originally received the update.

* * * * *